(12) United States Patent
Kim et al.

(10) Patent No.: US 7,995,162 B2
(45) Date of Patent: Aug. 9, 2011

(54) LIQUID CRYSTAL DISPLAY DEVICE AND METHOD FOR MANUFACTURING THE SAME

(75) Inventors: Ki Seung Kim, Gyeonggi-do (KR); Sang Chul Jung, Daegu-si (KR); Jeong Hoon Lee, Gyeongsangbuk-do (KR); Dhang Kwon, Daejeon-si (KR); Hang Sup Cho, Gyeongsangbuk-do (KR); Eun Ha Lee, Gyeonggi-do (KR); Ho Su Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 238 days.

(21) Appl. No.: 12/318,292

(22) Filed: Dec. 24, 2008

(65) Prior Publication Data

US 2010/0073612 A1 Mar. 25, 2010

(30) Foreign Application Priority Data

Sep. 24, 2008 (KR) .................. 10-2008-0093742

(51) Int. Cl.
*G02F 1/1335* (2006.01)
*G02F 1/1341* (2006.01)
(52) U.S. Cl. ........................... 349/106; 349/187
(58) Field of Classification Search .............. 349/106, 349/141, 187, 38–43, 147
See application file for complete search history.

(56) References Cited

U.S. PATENT DOCUMENTS

| | | | | |
|---|---|---|---|---|
| 6,967,353 B2* | 11/2005 | Suzuki et al. | ................... | 257/95 |
| 7,532,270 B2* | 5/2009 | Hashimoto et al. | ............. | 349/43 |
| 2002/0085157 A1* | 7/2002 | Tanaka et al. | ................. | 349/147 |
| 2006/0121643 A1* | 6/2006 | Seo et al. | ......................... | 438/99 |
| 2006/0255726 A1* | 11/2006 | Kim | ............................. | 313/506 |
| 2007/0064486 A1* | 3/2007 | Sung et al. | ............... | 365/185.13 |

* cited by examiner

*Primary Examiner* — Akm E Ullah
(74) *Attorney, Agent, or Firm* — Morgan, Lewis & Bockius LLP

(57) ABSTRACT

Disclosed are a liquid crystal display device without a black matrix capable of eliminating light leakage while not decreasing opening degree and reducing production costs and, in addition, a method for fabricating the liquid crystal display device described above. The liquid crystal display device includes: a thin film transistor formed on a first substrate; a first passivation layer formed on the first substrate including the thin film transistor; a color filter layer formed on the first passivation layer; a second passivation layer formed on the first substrate including the color filter layer; a pixel electrode which passes through the second and the first passivation layers, is electrically connected to a part of the thin film transistor and has a lamination structure of transparent metal and opacity metal, wherein the transparent metal part has a width wider than that of the opacity metal part; and a second substrate corresponding to the first substrate.

7 Claims, 6 Drawing Sheets

LIQUID CRYSTAL DISPLAY DEVICE AND METHOD FOR MANUFACTURING THE SAME

This application claims the benefit of Korean Patent Application No. P10-2008-0093742, filed on Sep. 24, 2008, which is hereby incorporated by reference as if fully set forth herein.

BACKGROUND OF THE INVENTION

1. Field of the Invention

The present invention relates to liquid crystal display devices and a method for manufacturing the same and, more particularly, to a liquid crystal display device with improved luminescence and a method for manufacturing the same.

2. Discussion of the Related Art

With progress towards an advanced information society, there is a strong need for development of high quality flat panel display devices with excellent characteristics such as thinness, lightweight and low power consumption. Among those, a liquid crystal display device with superior resolution, color display, image quality, etc. is widely used in various applications including a notebook type computer, a laptop monitor, and the like.

In general, a liquid crystal display device has a structure wherein two substrates have two sides facing each other, each of which has an electrode thereon, and a liquid crystal material is introduced between the substrates. Therefore, when a certain voltage is applied to both of the electrodes to generate an electric field, liquid crystal molecules become movable by the electric field to vary light transmittance so that the liquid crystal display device may display images by the varied light transmittance.

A bottom substrate of the liquid crystal display device is fabricated by using an array substrate having a thin film transistor, which applies signals to a pixel electrode, so as to form a thin layer, lithographically etching the formed thin layer, and repeating these processes. A top substrate of the liquid crystal display device comprises a common electrode and a color filter, which has three colors of red (R), green (G) and blue (B) arranged in sequence, and this top substrate is fabricated by pigment dispersion, dyeing, electro-deposition, and so forth. Among these, the pigment dispersion has superior precision and excellent reproduction, thus being widely applicable.

Such a liquid crystal display device is normally fabricated by forming an array substrate and a color filter substrate, and arranging a pixel electrode on a bottom substrate to correspond to a color filter on a top substrate. During the arrangement step, misalignment problems may occur to cause failures such as light leakage.

In order to solve problems described above, the top substrate may have a wider black matrix and, in this case, a degree of opening of the liquid crystal display device may be reduced.

Therefore, a method has recently been proposed to form a color filter on an array substrate in order to prevent misalignment and improve degree of opening of the liquid crystal display device. Such a structure of a color filter formed on a top side of a thin film transistor refers to a Color Filter on Thin Film Transistor (COT) structure.

FIG. 1 is a cross-sectional view illustrating a typical liquid crystal display device having a COT structure.

Referred to FIG. 1, a gate electrode 12 made of a conductive substance such as metal is formed on a transparent first substrate 11, and a gate insulating film 13 consisting of a silicon nitride (SiNx) or silicon oxide (SiO$_2$) film covers the gate substrate 12.

On the gate insulating film 13 formed on the top side of the gate electrode 12, an active layer 14 made of amorphous silicon may be formed, followed by additionally forming an ohmic contact layer 15, which comprises amorphous silicon and is doped with foreign materials (or impurities), on the active layer 14.

A source electrode 16a made of conductive substance such as metal as well as a drain electrode 16b are formed on a top side of the ohmic contact layer 15, wherein the source and drain electrodes 16a and 16b are used to fabricate a thin film transistor T together with the gate electrode 12.

Although not illustrated in the drawings, the gate electrode 12 is connected to a gate wiring while the source electrode 16a is connected to a data wiring. Both the gate wiring and the data wiring cross to each other at right angles to define a pixel region.

A first substrate 11 including the source and drain electrode 16a and 16b may have a protective film 17 which comprises a silicon nitride film, a silicon oxide film or an organic insulating film in order to protect the thin film transistor T.

In the pixel region on the top side of the protective film 17, a color filter 18 is formed wherein R, G and B colors are aligned in sequence and each color corresponds to each pixel region. The color filter 18 may include a contact hole 19 exposing the drain electrode 16b in addition to the protective film 17.

A pixel electrode 20 made of a transparent conductive substance is formed on a top side of the color filter 18 to be electrically connected to the drain electrode 16b through the contact hole 19.

Further, a second transparent substrate 21 is located a certain distance above the first substrate 11 and a black matrix 22 is placed on an inner side of the second substrate 21 at a position corresponding to the thin transistor T. Although not illustrated, the black matrix 22 has an opening at a position corresponding to the pixel electrode 20 and is formed on a bottom surface of the substrate.

Therefore, the black matrix 22 may prevent light leakage since liquid molecules are tilted on other parts except the pixel electrode 20, and may shield light incident on a channel part, thereby inhibiting generation of light leakage current.

In addition, an over-coat layer 23 is entirely formed on the bottom surface of the second substrate 21 having the black matrix 22.

A liquid crystal layer 30 is formed between the first substrate 11 and the second substrate 21.

As for the liquid crystal display device with a COT structure described above, the color filter 18 is formed on the first substrate 11 so that misalignment of the color filter and the pixel electrode 20 does not occur when the first substrate 11 is combined with the second substrate 21.

Therefore, alignment margin of the black matrix 22 in the second substrate 21 may be reduced and, if a black matrix substance with light penetration inhibitory effects is used to form a barrier pattern, the black matrix 22 on the second substrate 22 may be omitted, thereby improving opening degree of the liquid crystal display device.

FIGS. 2A to 2D are cross-sectional views illustrating a conventional method for manufacturing a liquid crystal display device having a COT structure.

As illustrated in FIG. 2A, a metal substance is deposited on a first transparent substrate 31 and is selectively removed through photolithography so as to form a gate electrode 32 and a common wiring 33.

A gate wiring (not shown) which is connected to the gate electrode 32 and extends in one direction may be formed during formation of the gate electrode.

Continuously, an insulating substance such as a silicon nitride film or a silicon oxide film is thoroughly deposited on a top surface of the first substrate 31 including the gate electrode 32 so as to form a gate insulating film 34.

As illustrated in FIG. 2B, an amorphous silicon layer and another amorphous silicon layer doped with impurities are doped on the gate insulating film 34 in this order.

After that, the amorphous silicon layer doped with impurities and the other amorphous silicon layer located under the doped silicon layer are selectively removed to form an active layer 35 and an ohmic contact layer 36.

Following this, a metal substance is entirely deposited on the first substrate 31 and selectively removed through photolithography to form a source electrode 37a and a drain electrode 37b.

While forming the source electrode 37a and the drain electrode 37b, a data wiring (not shown) which is extended from the source electrode 37a and crosses the gate wiring at right angles to define a pixel region may also be formed.

The ohmic contact layers 36 exposed by the source electrode 37a and the drain electrode 37b are selectively removed. Herein, the source electrode 37a and the drain electrode 37b may be formed a certain distance apart from each other in order to form a channel in a following process.

Subsequently, a first passivation layer 38 is entirely formed on the top surface of the first substrate 31.

As illustrated in FIG. 2C, a photosensitive material is applied to a top side of the first passivation layer 38, followed by exposing and patterning the same to form a color filter layer 39 in the pixel region.

Since the color filter layer 39 normally comprises R, G and B colors, applying, exposing and developing processes may be repeated three times so as to produce the color filter layer capable of embodying the colors, respectively.

After that, a second passivation layer 40 is entirely formed on the top surface of the first substrate 31 having the color filter layer 39, and then, the second and the first passivation layers 40 and 38 are selectively removed by a photolithographic process, so as to form a contact hole through which the drain electrode 37b is partially exposed.

Next, a transparent conductive material is deposited on the entire portion of the top surface of the first substrate 31 having the contact hole, and is selectively removed by a photolithographic process so that a pixel electrode 41 connected to the drain electrode 37b through the contact hole and a common electrode 42 spaced from the pixel electrode 41 at a certain distance may be formed.

As illustrated in FIG. 2D, a black matrix 52 which is arranged at a certain interval corresponding to a thin film transistor except the pixel region may be formed on a bottom surface of a second substrate 51 corresponding to the first substrate 31, and then, an over-coat layer 53 may be entirely formed on the bottom surface of the second substrate 51 having the black matrix 52.

However, the conventional method for manufacturing a liquid crystal display device as described above has problems as follows.

That is, a black matrix typically formed on a top substrate corresponds to a thin transistor formed on a bottom substrate in order to prevent light leakage at stepped parts due to color overlap. Therefore, formation of such a black matrix may cause an increase in production costs and light leakage due to misalignment during formation of the black matrix.

SUMMARY OF THE INVENTION

Accordingly, the present invention is directed to solve the problems described above in regard to conventional techniques, and an object of the present invention is to provide a liquid crystal display device without a black matrix, capable of preventing light leakage while not decreasing opening degree and, in addition, reducing production costs and, as well as a method for fabricating the liquid crystal display device described above.

To achieve this object and other advantages and in accordance with the purpose of the invention, there is provided a liquid crystal display device according to the present invention comprising: a thin film transistor formed on a first substrate; a first passivation layer formed on the first substrate including the thin film transistor; a color filter layer formed on the first passivation layer; a second passivation layer formed on the first substrate including the color filter layer; a pixel electrode which passes through the second and the first passivation layers, is electrically connected to a part of the thin film transistor and has a lamination structure of transparent metal and opacity metal, wherein the transparent metal part has a width wider than that of the opacity metal part; and a second substrate corresponding to the first substrate.

In addition, a method for fabrication of a liquid crystal display device according to the present invention comprises: forming a thin film transistor on a first substrate; forming a first passivation layer on the first substrate including the thin film transistor; forming a color filter layer on the first passivation layer; forming a second passivation layer on the first substrate including the color filter layer; selectively removing the second and the first passivation layers to form a contact hole through which the thin film transistor is partially exposed; laminating a transparent metal and an opacity metal on the entire portion of the top surface of the first substrate including the contact hole in sequence; selectively removing the opacity metal and the transparent metal to form a pixel electrode which is electrically connected to a part of the thin film transistor through the contact hole; selectively removing the opacity metal part to expose an edge portion of the transparent metal part; and forming a second substrate corresponding to the first substrate.

The liquid crystal display device and the method for fabricating the same according to the present invention are advantageous in that:

First, a top substrate has no black matrix and a pixel electrode has a lamination structure of transparent metal and opacity metal substances so that a top side of the pixel electrode is covered with the opacity metal part so as to reduce black luminescence while an edge portion of the pixel electrode is formed of transparent metal part to open the electrode part, thus improving luminescence.

Second, neither a black matrix nor over-coat layer is formed, thereby simplifying production processes and decreasing production costs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Hereinafter, other purposes, characteristics and other beneficial features of the present invention will become apparent from the following detailed description with reference to illustrative examples, taken in conjunction with the accompanying drawings.

A liquid crystal display device and a method for fabricating the same according to the present invention to achieve the above objects will be described in detail by the following description with reference to the accompanying drawings.

Figure 1:
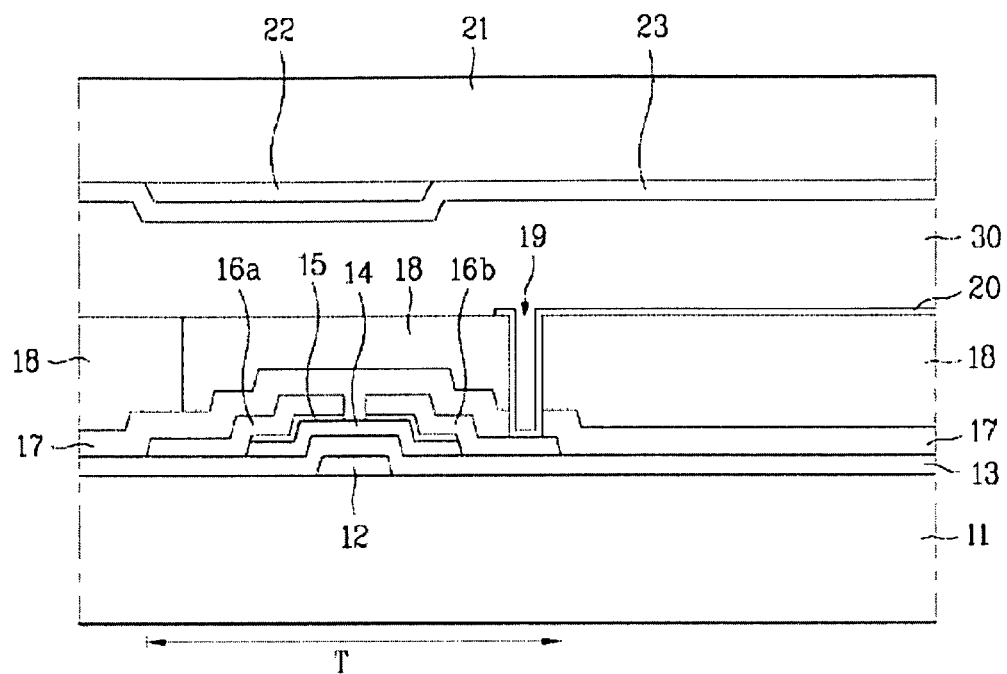
FIG. 1 is a cross-sectional view illustrating a liquid crystal display device having a typical COT structure.
Figure 2A:
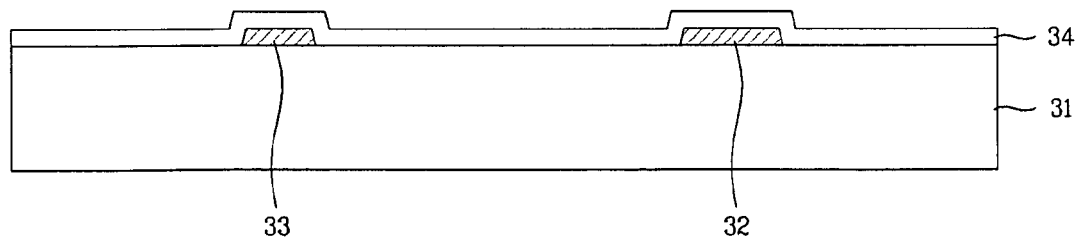
FIGS. 2A to 2D are cross-sectional views illustrating a conventional method for manufacturing a liquid crystal display device having a COT structure.
Figure 2B:
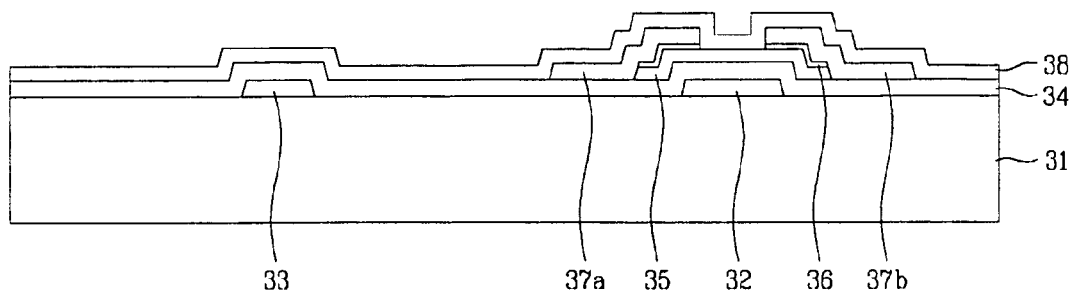
Figure 2C:
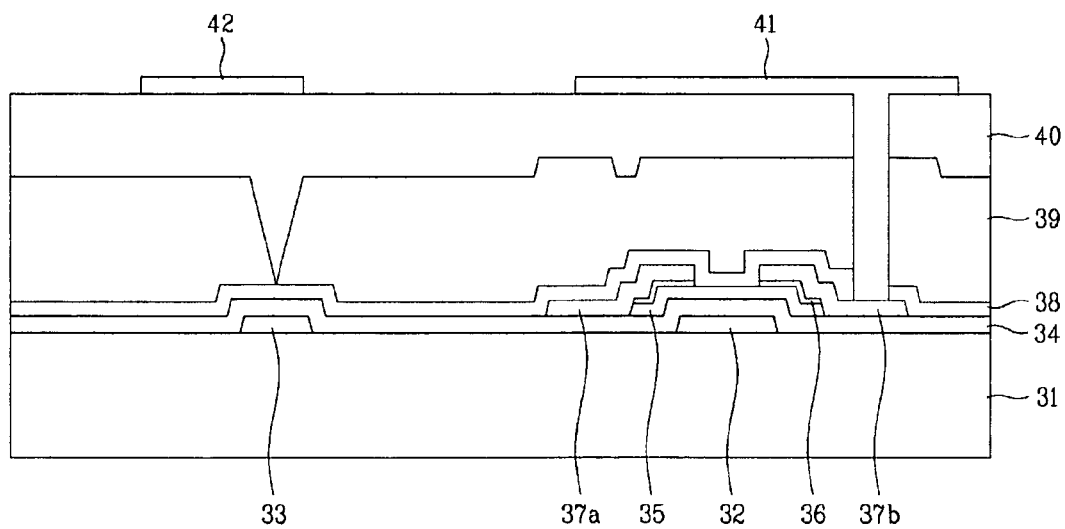
Figure 2D:
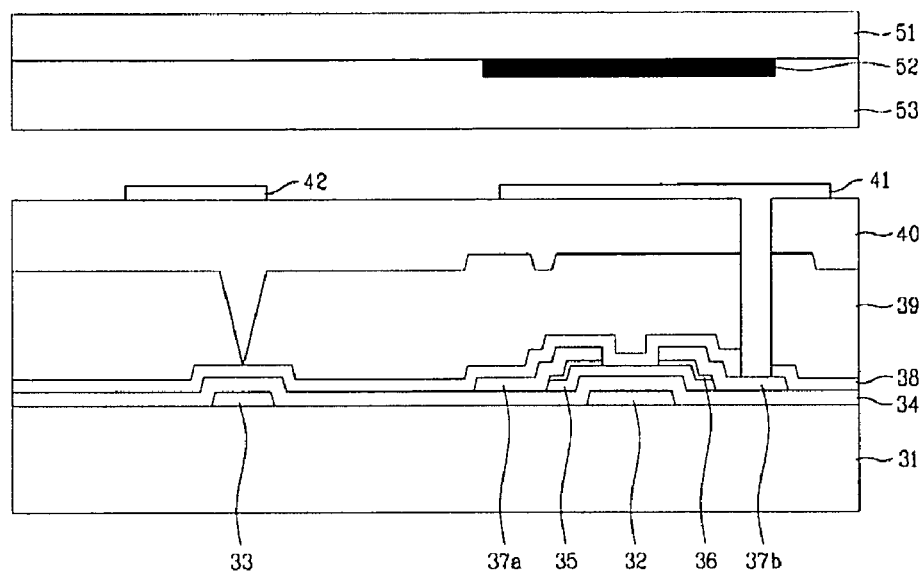
Figure 3:
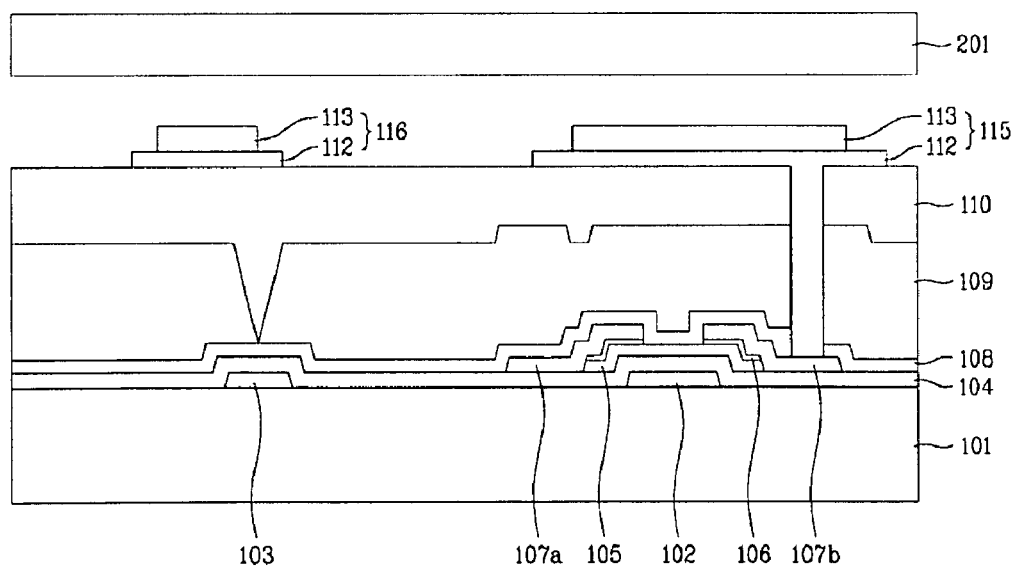
FIG. 3 is a cross-sectional view illustrating a liquid crystal display device according to the present invention.

FIG. 3 is a cross-sectional view illustrating a liquid crystal display device of the present invention.

As illustrated in FIG. 3, the liquid crystal display device includes: a gate electrode 102 and a common wiring 103 formed on a first substrate 101 at a certain interval; a gate insulating film 104 formed on a top surface of the first substrate including the gate electrode 102; an active layer 105 formed on the gate insulating film 104 to correspond to the gate electrode 102; a source electrode 107a and a drain electrode 107b which are formed a certain distance from both ends of the active layer 105 by interposing ohmic contact layers 106, respectively; a first passivation layer 108 formed on the entire portion of the top surface of the first substrate 101 including the source electrode 107a and the drain electrode 107b; a color filter layer 109 formed on a top side of the first passivation layer 108; a second passivation layer 110 formed on the entire portion of the top surface of the first substrate 101 including the color filter layer 109; a pixel electrode 105 which passes through the second and the first passivation layers 110 and 108, and then, is electrically connected to the drain electrode 107b; a common electrode 116 which is formed on a top side of the second passivation layer 110 and spaced from the pixel electrode 115 at a certain interval; and a second substrate 201 formed to correspond to the first substrate 101.

Each of the pixel electrode 115 and the common electrode 116 has a lamination structure of transparent metal 112 and opacity metal 113, wherein the opacity metal part 113 has a width narrower than that of the transparent metal part 112 and an edge portion of the transparent metal part 112 is exposed. That is, in order to expose both edge portions of the transparent metal part 112, the opacity metal part 113 has a narrower width compared to the transparent metal part 112.

Meanwhile, the gate electrode 102, the active layer 106, the source electrode 107a and the drain electrode 107b constitute the thin film transistor.

FIGS. 4A to 4G are cross-sectional views illustrating a method for fabrication of a liquid crystal display device according to the present invention.

Figure 4A:
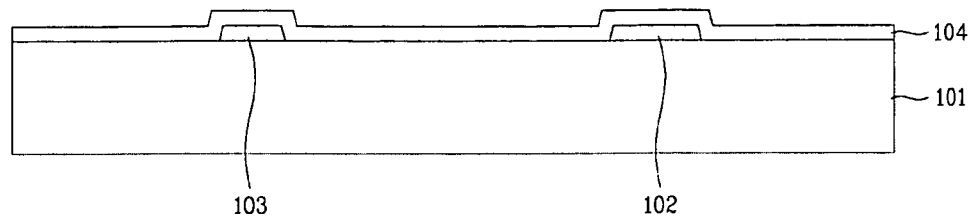
FIGS. 4A to 4G are cross-sectional views illustrating a method for fabrication of a liquid crystal display device according to the present invention.

As illustrated in FIG. 4A, a metal substance is deposited on a top surface of a first transparent substrate 101, and then, is selectively removed by a photolithographic process so as to form a gate electrode 102 and a common electrode 103.

In this case, a gate wiring (not shown) which is connected to the gate electrode 102 and extends in one direction may be formed while forming the gate electrode 102.

The metal substance used herein may be formed by depositing one metal having low resistance selected from copper (Cu), aluminum (Al), aluminum alloy such as aluminum neodymium (AlNd), molybdenum (Mo), chromium (Cr), titanium (Ti), tantalum (Ta), molybdenum-tungsten (MoW), and so forth to form a single layer or continuously depositing two or more of the above metals to form a double layer.

Following this, an inorganic insulating material such as silicon oxide (SiOx) or silicon nitride (SiNx) is deposited on the top surface of the first substrate 101 including the gate electrode 102 by a commonly known plasma enhanced chemical vapor deposition (PECVD) method so as to form a gate insulating film 103.

Figure 4B:
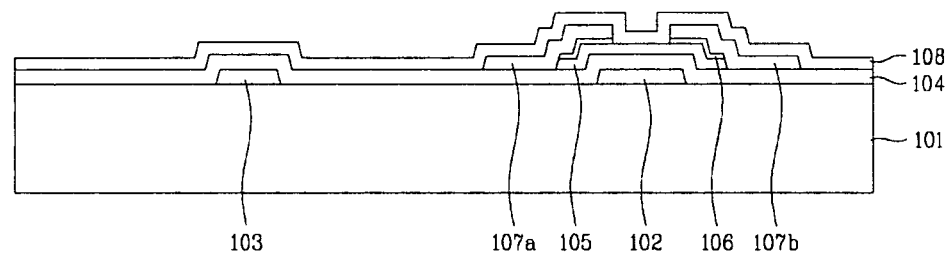

As illustrated in FIG. 4B, an amorphous silicon layer and another amorphous silicon layer doped with impurities are sequentially deposited on the gate insulating film 103.

Continuously, the doped silicon layer and the silicon layer placed under the doped silicon layer are selectively removed through photolithography so as to form an active layer 105 and an ohmic contact layer 106.

Next, a metal substance is deposited on the entire portion of the top surface of the first substrate 101, and then, selectively removed through photolithography so as to form a source electrode 107a and a drain electrode 107b.

During formation of the source electrode 107a and the drain electrode 107b, a data wiring (not shown) extending from the source electrode 107a and crossing the gate wiring at right angles so as to define a pixel region.

The metal substance used herein may be formed by depositing one metal having low resistance selected from copper (Cu), aluminum (Al), aluminum alloy such as aluminum neodymium (AlNd), molybdenum (Mo), chromium (Cr), titanium (Ti), tantalum (Ta), molybdenum-tungsten (MoW), and so forth to form a single layer or continuously depositing two or more of the above metals to form a double layer.

The ohmic contact layer 106 exposed by the source electrode 107a and the drain electrode 107b may be selectively removed. Herein, the source electrode 107a and the drain electrode 107b are spaced from each other at a certain interval to form a channel in a following process.

In an exemplary embodiment of the present invention, different masking processes are adopted to form the active layer 105, the source electrode 107a and the drain electrode 107b, however, the present invention is not particularly limited thereto. Preferably, in order to reduce the number of masks to be used, an amorphous silicon layer and another amorphous silicon layer doped with impurities are formed in sequence, followed by depositing a metal substance and etching all of these with only one mask.

Following this, the first passivation layer 108 is formed on the entire portion of the top surface of the first substrate 101 including the source electrode 107a and the drain electrode 107b.

Figure 4C:
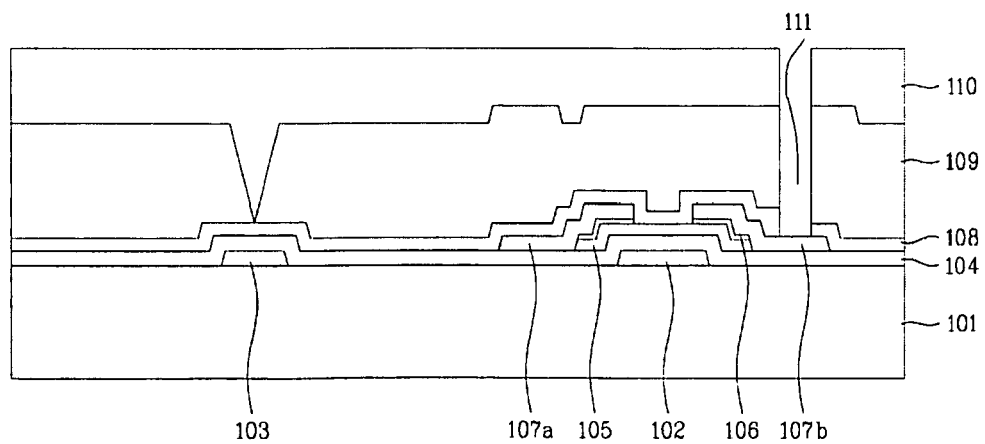

As illustrated in FIG. 4C, a photosensitive material is applied to the first passivation layer 108, and then, is exposed and patterned to form a color filter layer 109 in the pixel region.

The color filer layer 109 comprises R, G and B colors and these applying, exposing and developing processes may be repeated three times in order to embody all of these colors.

Subsequently, a second passivation layer 110 is formed on the entire portion of the top surface of the first substrate 101 including the color filter layer 109, and the second and the first passivation layers 110 and 108 are selectively removed through photolithography, so as to form a contact hole 111.

Figure 4D:
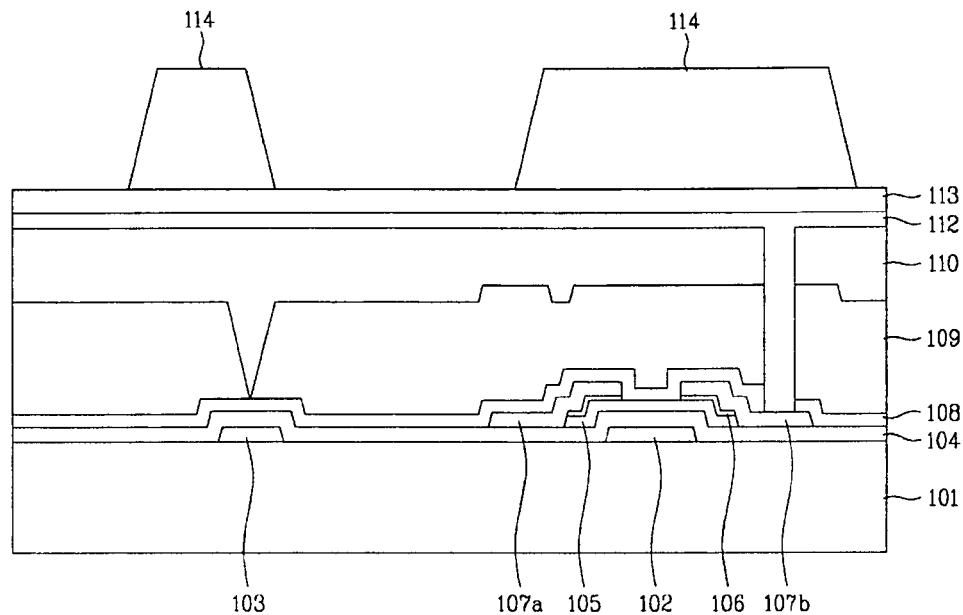

As illustrated in FIG. 4D, a transparent metal 112 and an opacity metal 113 are deposited in sequence on the entire portion of the top surface of the first substrate 101 including the contact hole 111.

The transparent metal 112 may include indium tin oxide (ITO), tin oxide (TO), indium zinc oxide (IZO), indium tin zinc oxide (ITZO), etc.

The opacity metal 113 may include Cu, Al, AlNd, Mo, Cr, Ti, Ta, etc.

In an exemplary embodiment of the present invention, the transparent metal is ITO while the opacity metal is MoTi.

Next, after a photoresist 114 is applied to the opacity metal 113, the photoresist 114 is selectively patterned by exposing and developing processes.

Figure 4E:
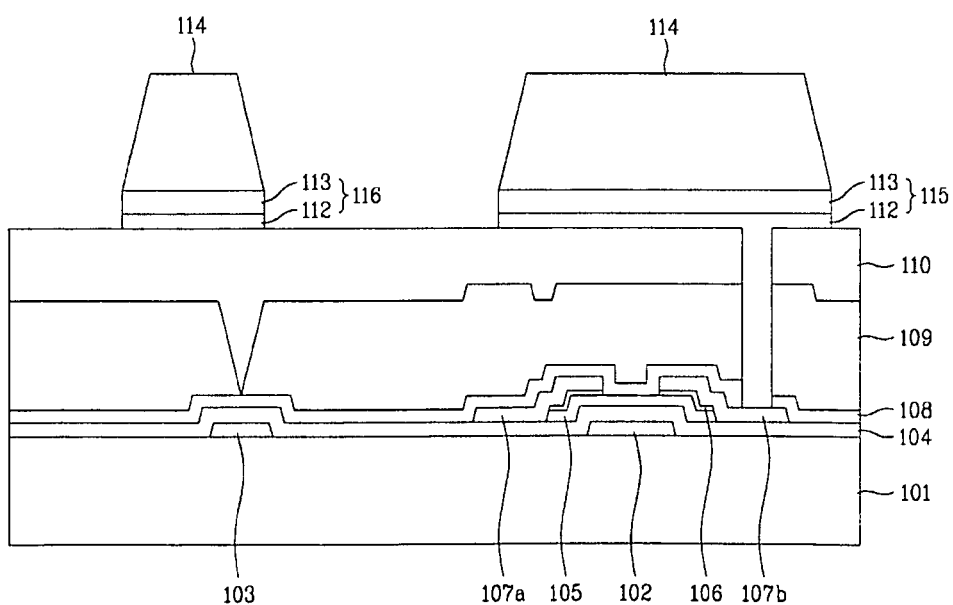

As illustrated in FIG. 4E, using the patterned photoresist 114 as a mask, the opacity metal 113 and the transparent metal 112 are selectively removed so as to form a pixel electrode 115 and a common electrode 116.

Figure 4F:
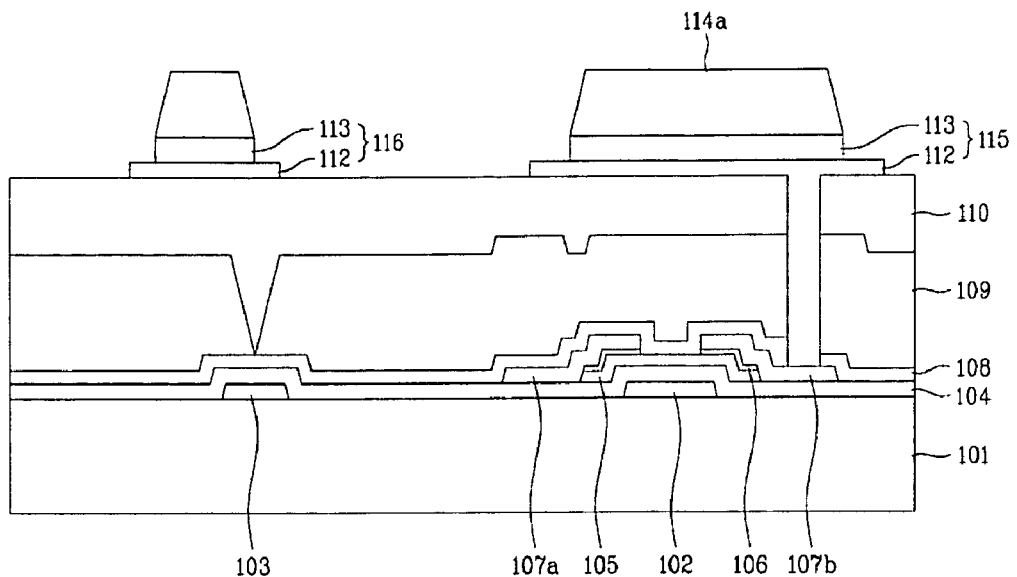

As illustrated in FIG. 4F, after O2 ashing the patterned photoresist, a thickness and a width of the photoresist 114 are decreased.

Using the ashed photoresist 114a as a mask, the opacity metal 113 is selectively removed.

The selectively removed opacity metal 113 may have a width narrower than that of the transparent metal 112, so that an edge portion of the transparent metal 112 is exposed.

Figure 4G:
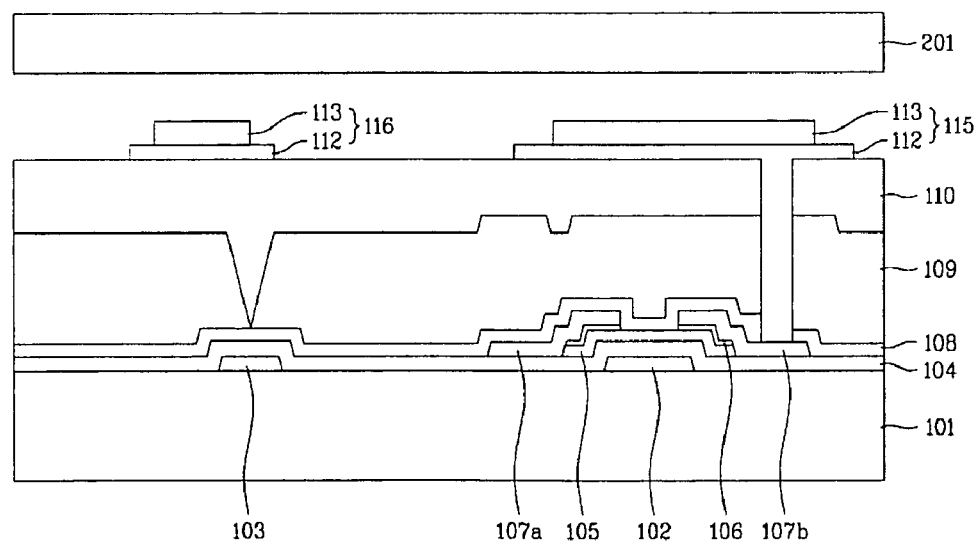

As illustrated in FIG. 4G, after removing the photoresist 114a, a second substrate 201 is prepared to correspond to the first substrate 101.

Although not illustrated in the drawings, after a column spacer is placed on the second substrate 201, the first substrate 101 is combined with the substrate 201, followed by injecting liquid crystal therein.

In an exemplary embodiment of the present invention, liquid crystal is introduced to the combined first and second substrates. However, liquid crystal is firstly dropped into the center of the first substrate 101 after forming a sealant around a peripheral side of the first substrate 101, followed by combination of the first substrate 101 with the second substrate 201.

The following Table 1 shows luminescence and CR characteristics of a pixel electrode having a lamination structure of ITO and MoTi according to an exemplary embodiment of the present invention.

TABLE 1

|  | ITO | MoTi | ITO + MoTi |
|---|---|---|---|
| White luminescence (nit) | 600 | 550 | 597 |
| C/R | 1000 | 1200 | 1147 |
| Black luminescence (nit) | 0.6 | 0.45 | 0.52 |

As shown in Table 1, ITO has relatively high White luminescence and Black luminescence compared to MoTi, whereas MoTi exhibits C/R higher than that of ITO.

Accordingly, the present inventive method may fabricate a pixel electrode having a lamination structure of ITO+MoTi with favorable features described above, thus improving C/R as well as White or Black luminescence. In other words, the present invention may attain increased transmittance while reducing Black luminescence of a liquid crystal display device.

Although the exemplary embodiment of the present invention describes a liquid crystal display device having a COT structure using first and second passivation layers and a method for fabrication thereof, the present invention is not particularly restricted thereto. Preferably, the present invention may be applied to a typical IPS mode liquid crystal display device wherein a color filter layer is formed on a second substrate, as well as a method for fabrication of the same.

More particularly, as described above, a thin film transistor is formed on a first substrate 101, a passivation layer is formed on a top surface of the first substrate including the thin film transistor, and the passivation layer is selectively removed to expose a drain electrode of the thin film transistor, resulting in formation of a contact hole. Following this, a transparent metal and an opacity metal are deposited in this order on the entire portion of the top surface of the first substrate, and then, are treated by a photolithographic process to form a pixel electrode and a common electrode and, in addition, to form a color filter layer on a second substrate corresponding to the first substrate.

Although technical constructions and other features of the present invention have been described, it will be apparent to those skilled in the art that the present invention is not limited to the exemplary embodiments and accompanying drawings described above but may cover substitutions, variations and/or modifications thereof without departing from the scope of the invention defined in the appended claims.

What is claimed is:

1. A liquid crystal display device comprising:
   a thin film transistor formed on a first substrate;
   a first passivation layer formed on the first substrate including the thin film transistor;
   a color filter layer formed on the first passivation layer;
   a second passivation layer formed on the first passivation layer including the color filter layer;
   a pixel electrode formed of a lamination structure of a transparent metal part and a opacity metal part on the second passivation layer, and electrically connected to the thin film transistor by a contact hole passing through the second passivation layer, the color filter layer and the first passivation layer,
   wherein the opacity metal part has a width narrower than that of the transparent metal part, so as the edge portion of the transparent metal part is exposed; and
   a second substrate corresponding to the first substrate,
   wherein the thin film transistor is covered with the opacity metal part of the pixel electrode.

2. The liquid crystal display device according to claim 1, further comprising a common electrode formed of a lamination structure of a transparent metal part and a opacity metal part on the second passivation layer, and spaced a certain distance from the pixel electrode,
   wherein the opacity metal part has a width narrower than that of the transparent metal part, so as the edge portion of the transparent metal part is exposed.

3. A liquid crystal display device comprising:
   a thin film transistor formed on a first substrate;
   a passivation layer formed on the first substrate including the thin film transistor;
   a pixel electrode formed of a lamination structure of a transparent metal part and a opacity metal part on the passivation layer, and electrically connected to the thin film transistor by a contact hole passing through the passivation layer, wherein the opacity metal part has a width narrower than that of the transparent metal part, so as the edge portion of the transparent metal part is exposed; and a second substrate corresponding to the first substrate, on which a color filter layer is formed, wherein the thin film transistor is covered with the opacity metal part of the pixel electrode.

4. A method for fabrication of a liquid crystal display device comprising:

forming a thin film transistor on a first substrate;

forming a first passivation layer on the first substrate including the thin film transistor;

forming a color filter layer on the first passivation layer;

forming a second passivation layer on the first substrate including the color filter layer;

selectively removing the second and the first passivation layers to form a contact hole through which the thin film transistor is partially exposed;

laminating a transparent metal substance and an opacity metal substance on the entire portion of the top surface of the first substrate including the contact hole in sequence;

selectively removing the opacity metal and the transparent metal parts to form a pixel electrode which is electrically connected to a part of the thin film transistor through the contact hole;

selectively removing the opacity metal part to expose an edge portion of the transparent metal part; and forming a second substrate corresponding to the first substrate.

5. The method according to claim 4, further comprising a step of forming a common electrode spaced a certain distance from the pixel electrode, which has the same structure as the pixel electrode, simultaneously when the pixel electrode is formed.

6. The method according to claim 4, including:

applying photoresist to the opacity metal, exposing and developing the photoresist such that the photoresist is selectively patterned;

using the patterned photoresist as a mask and selectively removing the opacity metal and the transparent metal to form the pixel electrode;

$O_2$ ashing the photoresist to reduce a thickness and a width of the photoresist; and using the ashed photoresist as a mask to remove a part of the opacity metal.

7. A method for fabrication of a liquid crystal display device comprising:

forming a thin film transistor on a first substrate;

forming a passivation layer on the first substrate including the thin film transistor;

selectively removing the passivation layer to form a contact hole through which a part of the thin film transistor is exposed;

sequentially laminating a transparent metal and an opacity metal on the entire portion of the top surface of the first substrate including the contact hole;

selectively removing the opacity metal and the transparent metal to form a pixel electrode, which is electrically connected to a part of the thin film transistor through the contact hole, and a common electrode; and, selectively removing the opacity metal to expose an edge portion of the transparent metal; and forming a color filter layer on a second substrate corresponding to the first substrate.

* * * * *